(12) United States Patent
Goetheer et al.

(10) Patent No.: US 7,407,639 B2
(45) Date of Patent: Aug. 5, 2008

(54) METHOD FOR PREPARING PARTICLES OF A DEFINED SIZE IN A REACTION VESSEL

(75) Inventors: Earl Lawrence Vincent Goetheer, Geldrop (NL); Xiaojun Zhu, Geldrop (NL); Leo Jacques Pierre Van Den Broeke, Amsterdam (NL); Hubertus Wilhelmus Piepers, Eindhoven (NL); Johannes Theodorus Faustinus Keurentjes, Helmond (NL); Adelbert Antonius Henricus Drinkenburg, Geleen (NL); Arjan Willem Verkerk, 's-Hertogenbosch (NL)

(73) Assignee: Nederlandse Organisatie voor toegepast-natuurwetenschappelijk onderzoek TNO (NL)

( * ) Notice: Subject to any disclaimer, the term of this patent is extended or adjusted under 35 U.S.C. 154(b) by 316 days.

(21) Appl. No.: 10/524,326

(22) PCT Filed: Aug. 8, 2003

(86) PCT No.: PCT/NL03/00572

§ 371 (c)(1),
(2), (4) Date: Mar. 15, 2005

(87) PCT Pub. No.: WO2004/014536

PCT Pub. Date: Feb. 19, 2004

(65) Prior Publication Data

US 2005/0152825 A1    Jul. 14, 2005

(51) Int. Cl.
*C01B 31/24* (2006.01)
*C01B 9/00* (2006.01)
*B01J 8/08* (2006.01)
*B01J 19/28* (2006.01)

(52) U.S. Cl. .................... 423/419.1; 423/491; 423/659; 422/209; 422/239

(58) Field of Classification Search ............. 423/419.1, 423/430, 491, 659; 422/209, 239
See application file for complete search history.

(56) References Cited

FOREIGN PATENT DOCUMENTS

| EP | 157156 A1 | 10/1985 |
|---|---|---|
| JP | 63023734 | 2/1988 |
| WO | WO 01/45830 A1 | 6/2001 |

*Primary Examiner*—Wayne Langel
*Assistant Examiner*—James Fiorito
(74) *Attorney, Agent, or Firm*—Wood, Phillips, Katz, Clark & Mortimer

(57) ABSTRACT

The present invention relates to a method of preparing particles of a defined size and morphology, using a reaction of reactants, wherein the reaction is carried out in the presence of rotational forces and wherein the reactants are separated from each other by means of a contactor. The present method is suitable for preparing articles having a particle size from 10-2000 nm.

19 Claims, 7 Drawing Sheets

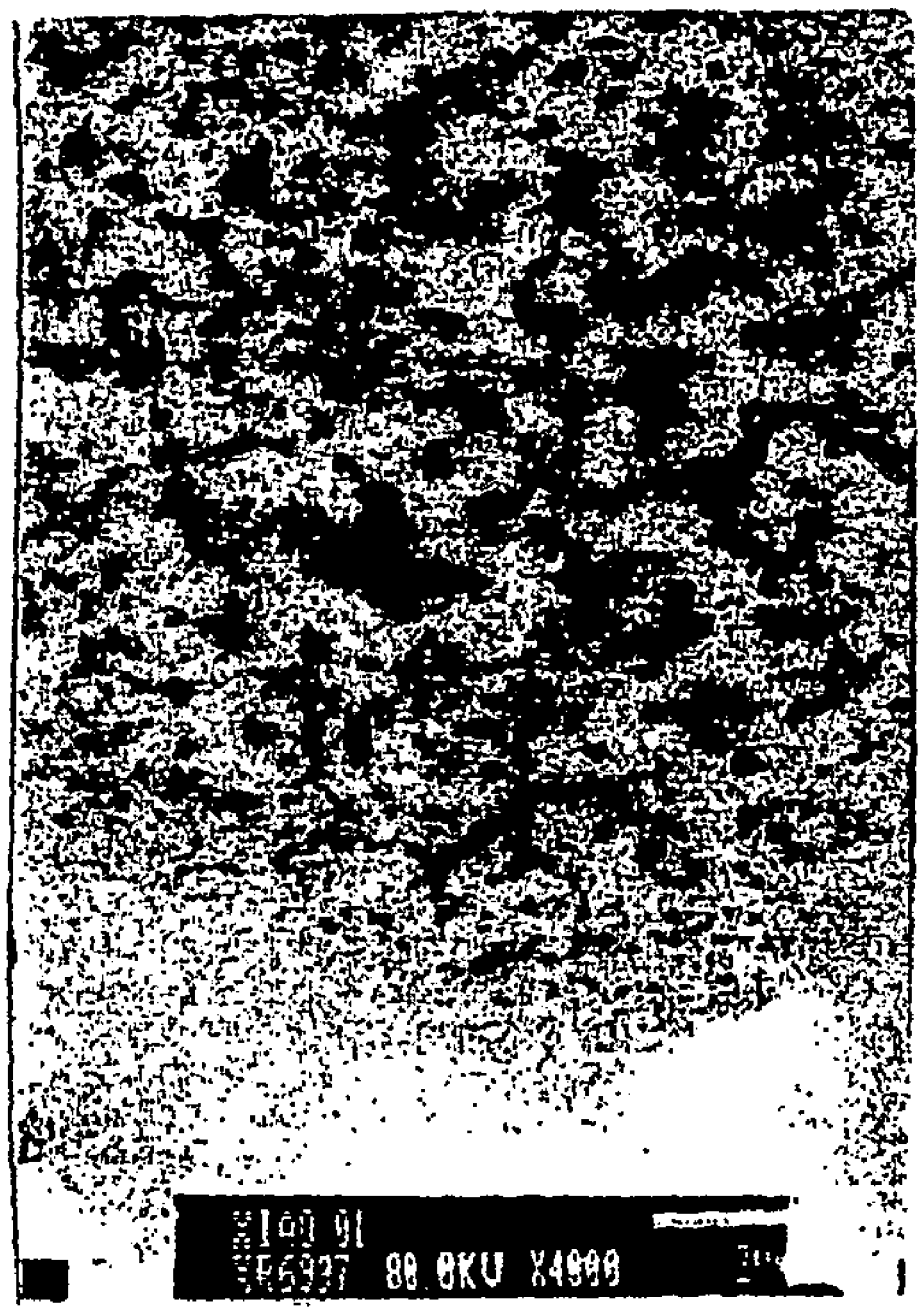
Figure 6 - part 1

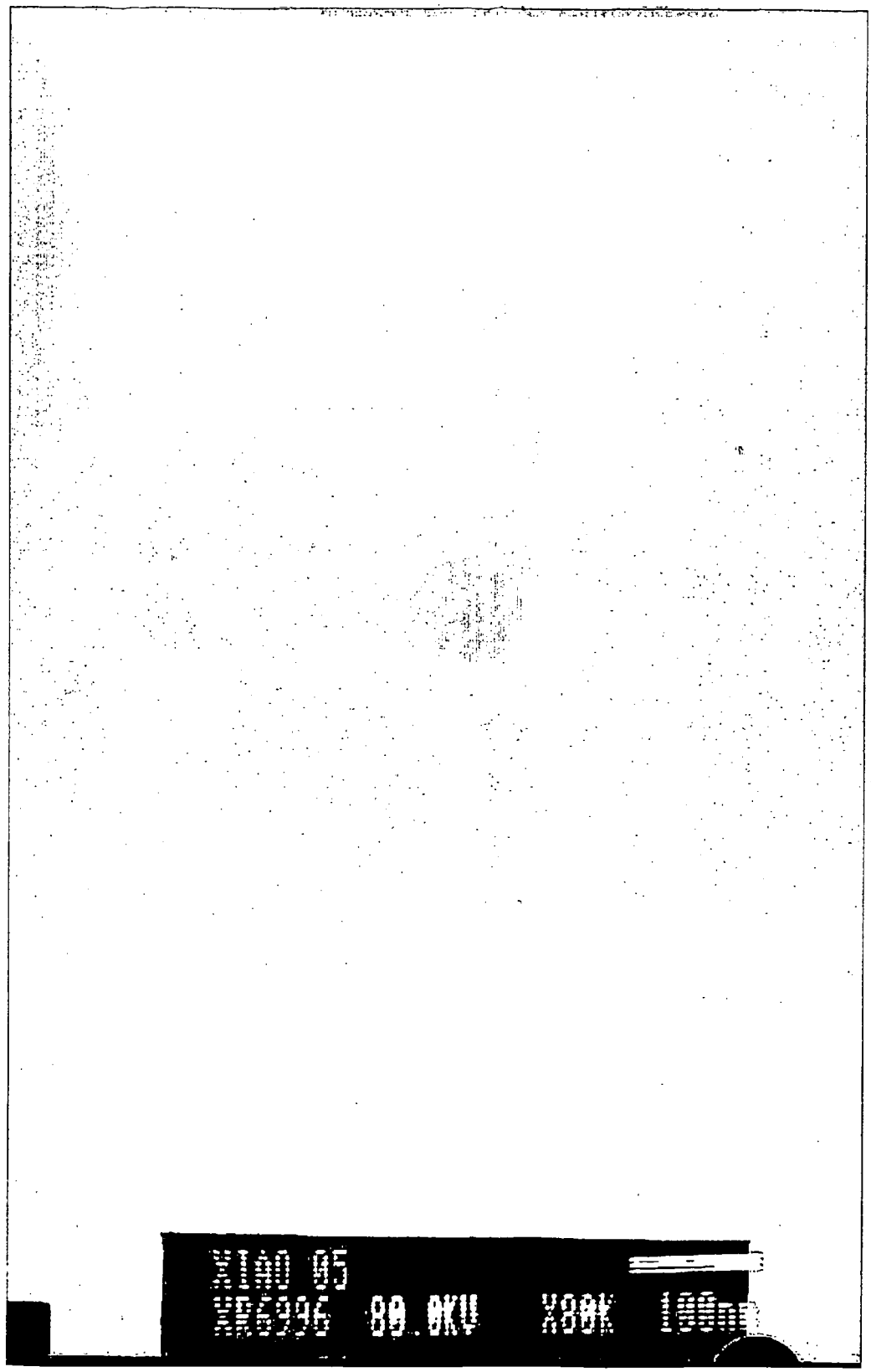
Figure 6 - part 2

METHOD FOR PREPARING PARTICLES OF A DEFINED SIZE IN A REACTION VESSEL

The present invention relates to a method of preparing particles of a defined size, using a reaction of reactants in a reaction vessel.

From International application WO 01/45830 there is known a tubular apparatus comprising a reaction vessel for accommodating a first phase and at least one membrane for accommodating a second phase. Only the membrane, which is positioned to be coaxial with the tubular reactor, is suitable for rotation, and after rotation of the membrane the second phase is controllably dispersed into the first phase. A drawback of such a construction is the fact that a precise and costly seal is required to prevent leakage of reactants. In addition, a uniform particle size distribution is not ensured during the start-up phase when such a method is used, which has an adverse effect on the reproducibility.

European patent application No. 0 157 156 relates to a continuous process for making manganese carbonate which is obtained by precipitating it from a manganese(II) salt solution by means of a diammonium carbonate solution, which reaction takes place while stirring.

Japanese patent publication JP-63-023734 relates to a method of preparing small particles, wherein a tubular reactor is used, in which reactor an inner tube having a smaller diameter is coaxially disposed. A reactive gas A is introduced into the central tubular reactor, in which reactor an inner tube having a smaller diameter is coaxially disposed, whilst a reactive gas B is supplied to the annular space formed between the inner tube and the tube surrounding said inner tube. An overpressure causes the reactive gas B to pass through the porous wall of the inner tube, resulting in a reaction between the reactive gas A and the reactive gas B.

Such a method is known, for example from U.S. Pat. No. 5,674,531, wherein nanoparticles are obtained by dissolving an active substance, e.g. insulin, and the ketalized polytartramidic acid separately, mixing the solutions obtained and introducing the mixture into a precipitating agent through a cannula having an external diameter of 0.2 to 1.2 mm, bonding the nanoparticles obtained to one or more ligands and finally filtering the nanoparticles through a filter having a pore size of 0.2 μm to 0.8 μm. From U.S. Pat. No. 5,840,111 there is furthermore known a process for producing a particulate nanodisperse titanium oxide having a maximal particle size distribution of between 1 and 10 nm, which process comprises the steps of mixing of solution comprising sulphuric acid and titanyl sulphate at an elevated temperature and an alkaline-reacting liquid until the mixture reacts to form titanium dioxide nanoparticles, cooling the obtained mixture and adding a monobasic acid to the thus-cooled mixture, causing the titanium dioxide nanoparticles to flocculate, recovering the resulting titanium dioxide nanoparticles flocculate, and finally washing the flocculate with a monobasic acid to obtain a precipitate. A drawback of the two aforesaid methods is the fact is that several reaction steps are required in order to obtain particles of a defined size. The use of several separate steps generally has an adverse effect on the reproducibility. Moreover, a slight loss of starting material will occur with every step, so that the yield of particles of a defined size will decrease.

Another known method of preparing nanoparticles is the use of reversed micro emulsions. This technique also has as a number of drawbacks, however. After all, micro emulsion processes are difficult to scale up, and another drawback is the fact that particles can only be obtained in a limited range of sizes.

One aspect of the present invention is to provide a method of preparing particles of a defined size and morphology, which method overcomes the aforesaid drawbacks of the prior art.

Another aspect of the present invention is to provide a method of preparing particles of a defined size and morphology, which method is considered to be suitable for preparing particles of a size ranging from 10-3000 nm.

Another aspect of the present invention is to provide a method of preparing particles of a defined size and morphology, wherein particles having a very specific particle size distribution are obtained.

The method as referred to in the introduction is characterized in that the reaction vessel is rotated, so that the reaction is carried out in the presence of rotational forces, wherein the reactants are separated from each other by means of a contactor, which contactor is so constructed that one reactant is contacted with the other reactant(s) under controlled conditions after it has passed the contactor, so as to form the reaction product, wherein the density of the reaction product thus formed is greater than that of the medium in which it has been formed.

The present method is relatively easy to scale up, and an important advantage is the fact that no auxiliary materials such as surfactants or organic solvents are required. Thus a clean and simple method is provided for obtaining particles of a defined size. The present method thus employs a rotational force for preparing particles on the one hand and for removing particles from the reaction zone on the other hand. The present method is in particular suitable for preparing particles of varying size and morphology and having a very uniform particle distribution. The special size of a particular particle depends, among other things, on the density of the starting materials, the rotational force that is employed, the temperature, the differences in density, the concentrations of reactants, the viscosity, the reaction time and the type of contactor, for example hydrophobicity, the pore size, the thickness of the contactor and the like. The products obtained by using the present method can be used for various purposes, for example in the production of semiconductors, pigments, catalytic converters and display screens.

The contactor used in the present invention is preferably selected from the group consisting of membrane, diaphragm, filter and atomizer, wherein in particular a membrane having a defined pore size is used. Such a contactor can be considered to be an element which keeps the reactants separated, but which subsequently makes it possible, after a rotational force has been exerted on the reaction vessel, to contact said one reactant with the other reactant(s) under controlled conditions after it has passed the contactor, so as to form the reaction product. In a specific embodiment, a number of contactors disposed one behind another, seen in the longitudinal direction of the reaction vessel, may be present in the reaction vessel.

In order to ensure that the reaction product being formed exits the reaction zone within a specific period of time, it is preferred to use a rotational force having an acceleration of at least 1000 g. If a rotational force having a value lower than 1000 g is used, the residence time of the reaction product in the reaction zone will be too long, as a result of which reaction products having a wide particle size distribution are obtained, which is undesirable.

The rotational forces employed in the present invention are preferably generated by carrying out the reaction in a centrifuge, with the selection of a specific centrifuge taking place in dependence on the desired rotation range. It should be understood that both the reaction vessel and the contactor present therein as well as the reactants are subject to rotational forces.

In order to obtain a precisely defined size of the reaction product, it is preferred to use a membrane having a molecular weight cut-off (MWCO) of maximally 500 kDa, in particular maximally 50 kDa, especially preferably maxially 3 kDa. When the aforesaid parameters are suitably set, the particle size of the reaction products formed by the reaction will range from 10-3000 nm, preferably said size will be less than 300 nm, in particular less than 50 nm.

In a preferred embodiment it is desirable for the reaction vessel to be of substantially circular cross-section, and for the contactor to extend over the entire cross-section of the reaction vessel, perpendicularly to the longitudinal axis thereof. When such a construction is used, a product of well-defined size and morphology is obtained, and in addition a specific particle size is achieved.

It should be understood that the present invention is not limited to liquids, but that any phase, viz the gas phase, the solid phase, the liquid phase and the supercritical phase, may be used both for the phase above the contactor and for the phase below the contactor, as long as the density of the reaction product that has been formed is greater than the density of the medium in which it has been formed. If two liquids separated by a contactor are used, wherein the contactor is e.g. an ultrafiltration membrane having a molecular weight cut-off (MCWO) of less than 100 kDa, which liquids are contacted with each other, the liquid present above the contactor will penetrate through the ultrafiltration membrane as a result of the action of the rotational forces and thus be added to the liquid present under the contactor in a controlled manner. The size of the droplets of the liquid from above the contactor in the lower liquid is determined by the properties of the two liquids and those of the contactor. In the contact layer positioned directly below the ultrafiltration membrane, the droplets passing through the membrane react with the liquid already present to form reaction products having a density greater than that of the medium, in particular the lower liquid in which the reaction takes place. The particles thus formed are removed from the reaction zone as a result of the action of the rotational forces that occur. In a specific embodiment it is desirable for an additional layer or phase to be present on top of the upper layer of reactants, in particular in order to prevent evaporation of active components from the layers of liquid.

It is in particular preferable for the proportion between the density of the reaction product being formed and the density of the medium in which the reaction product is being formed by means of the reaction to be at least 1.5:1, in particular for the proportion between the density of the reaction product being formed and the density of the medium in which the reaction product is being formed by means of the reaction to be at least 2:1.

The present invention is in particular suitable for forming inorganic particles belonging to the group of oxides, carbonates, sulphides, halogenides and cyanides of one or more metals, or combinations thereof.

The present invention furthermore relates to particles obtained by carrying out the present method, wherein the particles have a particle size ranging from 10-3000 nm and wherein said particles have a uniform particle size distribution.

The present invention furthermore relates to a device comprising a reaction vessel in which reactants separated by means of a contactor are present, which reaction vessel is suitable for rotation and wherein one reactant is contacted with the other reactant(s) under controlled conditions in the presence of rotational forces after it has passed the contactor. Preferably, the reaction vessel is of substantially circular cross-section, and the contactor extends over the entire cross-section of the reaction vessel, perpendicularly to the longitudinal axis thereof.

Using the present method, it is possible to control the geometric shape of the obtained reaction products, and in specific embodiments it is possible to obtain particles having a spherical shape or particles having a cubic shape.

The present invention will be explained hereinafter by means of a number of examples and Figures, in which connection it should be noted, however, that the present invention is by no means limited to such special examples.

FIG. 6 is an image obtained by means of a Transmission Electron Microscope (TEM) of particles obtained by using the present method.

EXAMPLE 1

Figure 1:
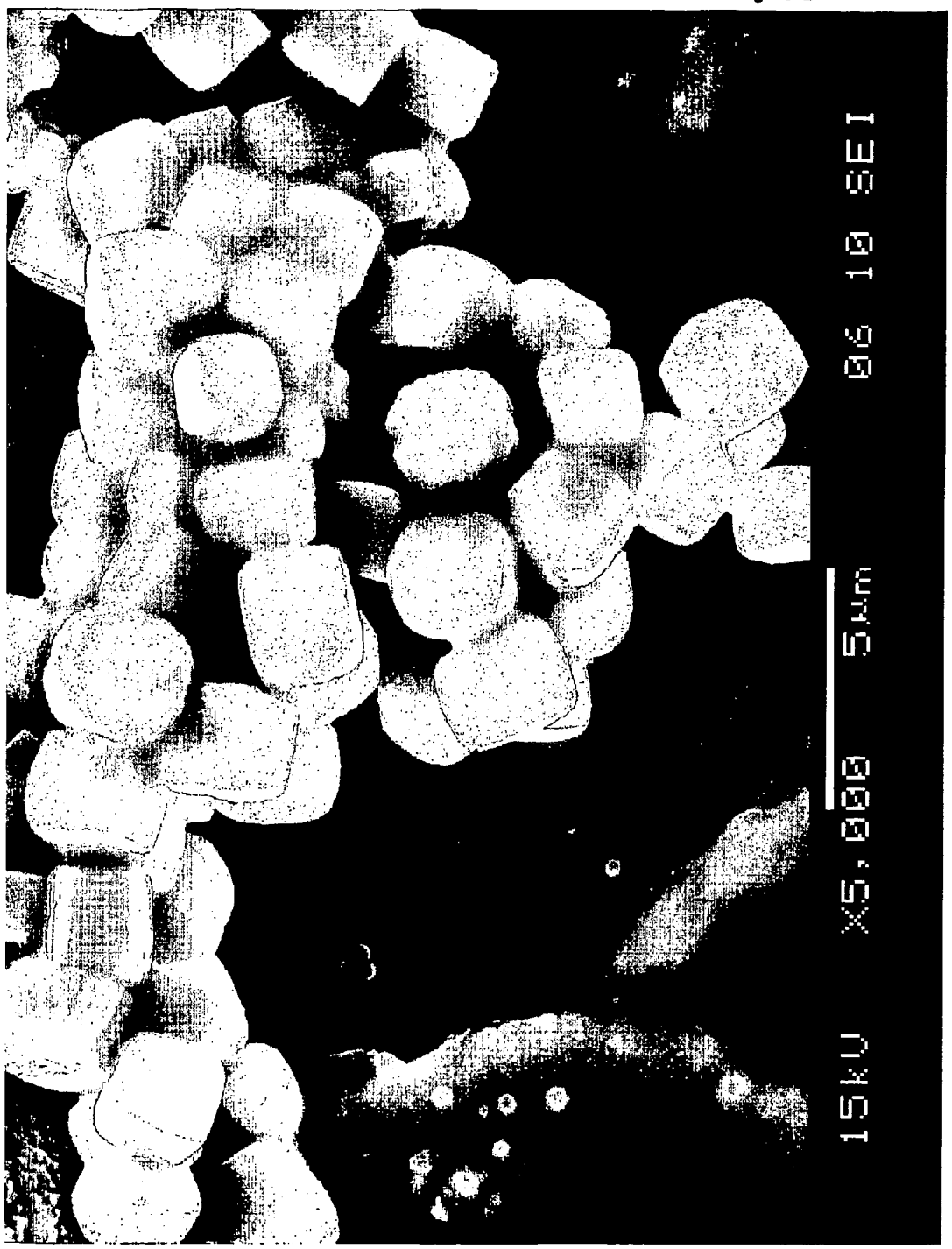
FIGS. 1-5 are images obtained by means of a Scanning Electron Microscope (SEM) of particles obtained by using the present methods.

A reaction vessel having a volume of 10 ml was first filled with 2 ml of 0.75 M $NH_4CO_3$ (aq), which lower phase was separated by means of a membrane having a MWCO of 10 kDa from an upper phase consisting of 5 ml of 0.5 M $MnSO_4$ (aq). The reaction vessel was placed in a centrifuge and the whole was rotated for 30 minutes, using a rotational force of 1500 g and a temperature of 30° C. Upon completion of said rotation step, the desired product $MnCO_3$ (s) and $NH_4SO_4$ (aq) was obtained, and the $MnCO_3$ was analysed by means of a Scanning Electron Microscope (SEM). The data from the analysis showed that monodisperse cubic $MnCO_3$ particles having a diameter of 1600 nm had been obtained (see FIG. 1).

EXAMPLE 2

Figure 2:
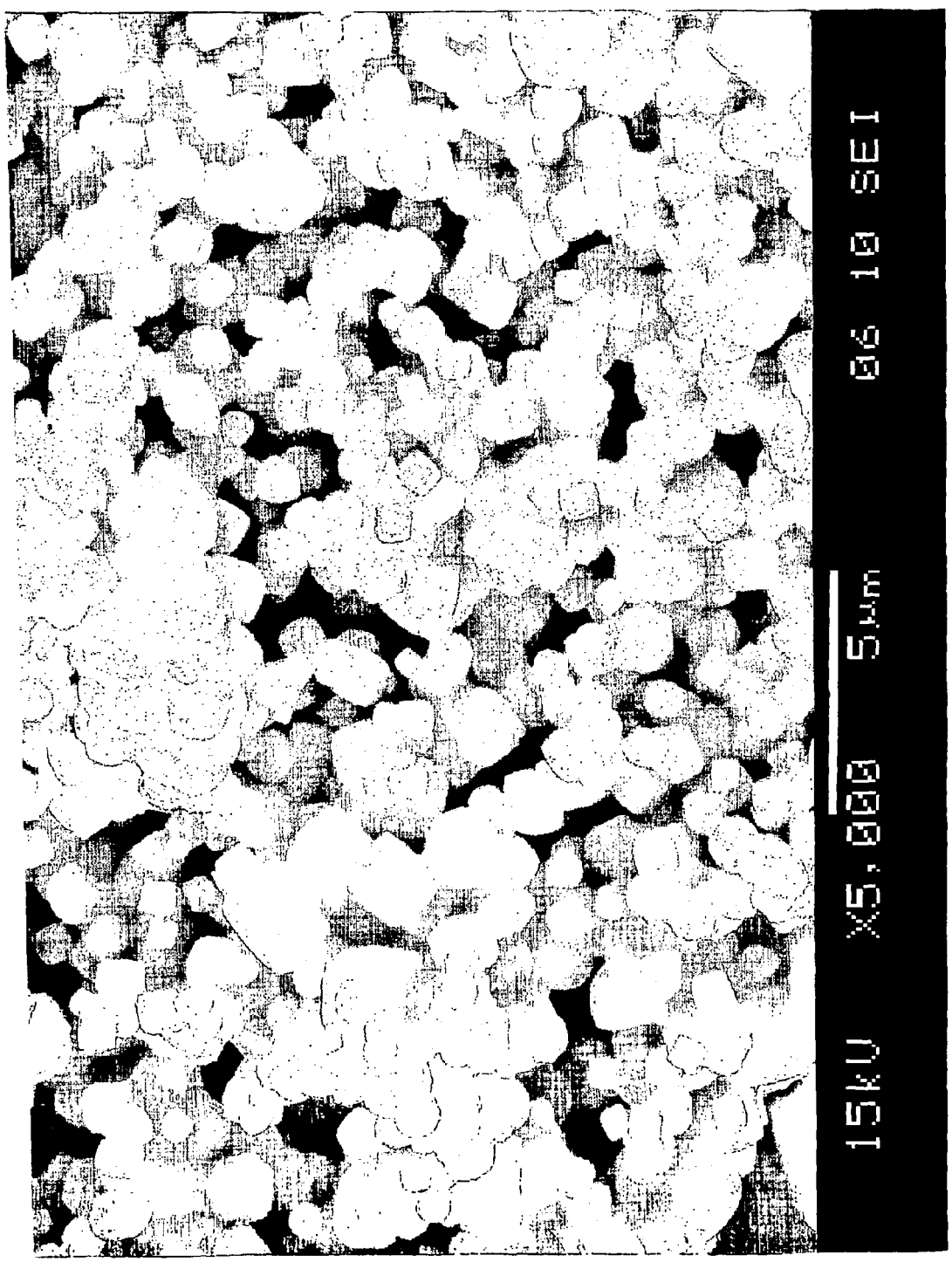

The same operations as in Example 1 were carried out, with this difference that a membrane having a MWCO of 30 kDa was used. The obtained reaction product $MnCO_3$ was analysed by means of a Scanning Electron Microscope (SEM), and the data from the analysis showed that disperse cubic $MnCO_3$ particles having a diameter of 800-3000 nm had been obtained (see FIG. 2).

EXAMPLE 3

Figure 3:
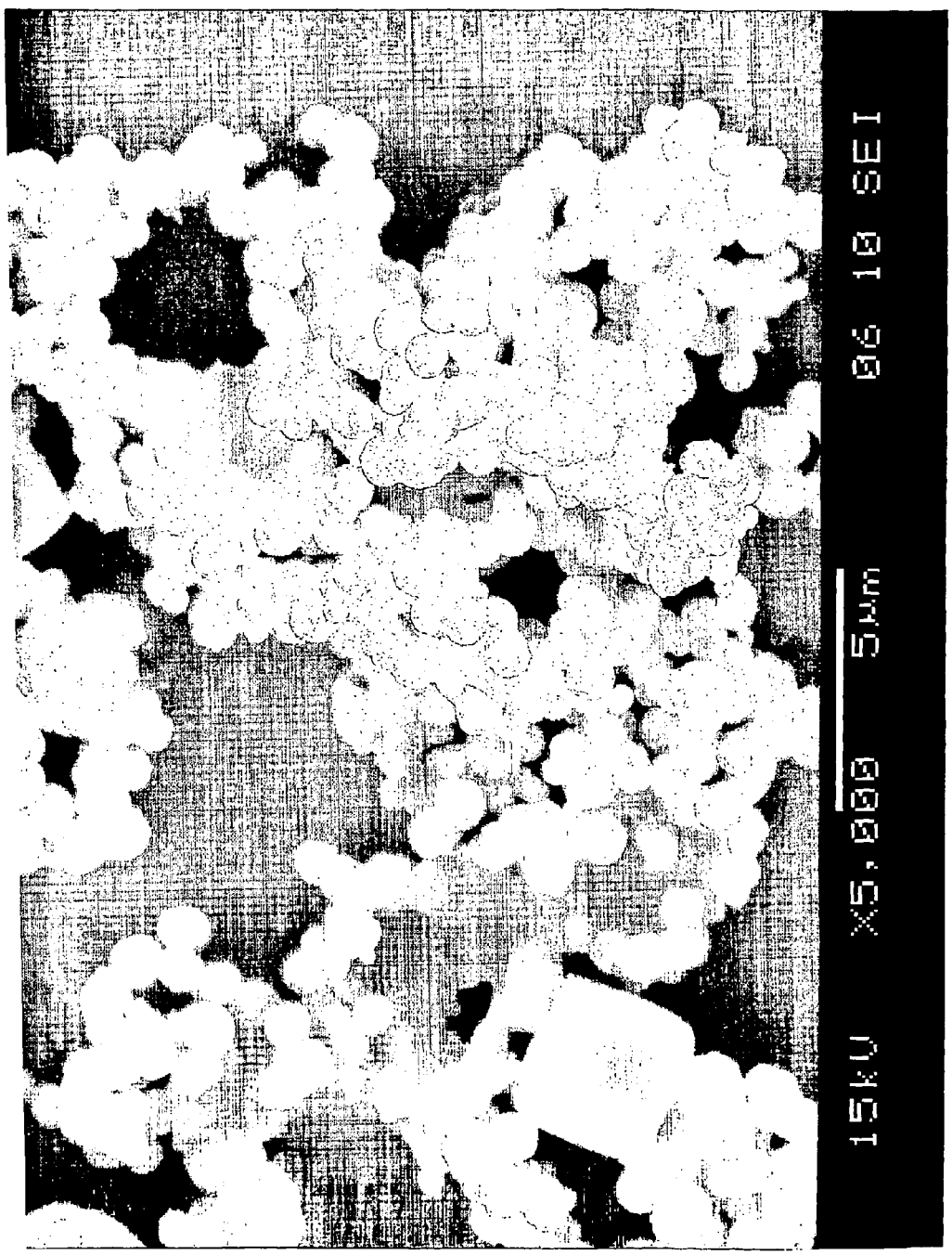

The same operations as in Example 1 were carried out, with this difference that a rotational force of 3000 g was used. The obtained reaction product $MnCO_3$ was analysed by means of a Scanning Electron Microscope (SEM), and the data from the analysis showed that monodisperse spherical $MnCO_3$ particles having a diameter of 700 nm had been obtained (see FIG. 3).

EXAMPLE 4

Figure 4:
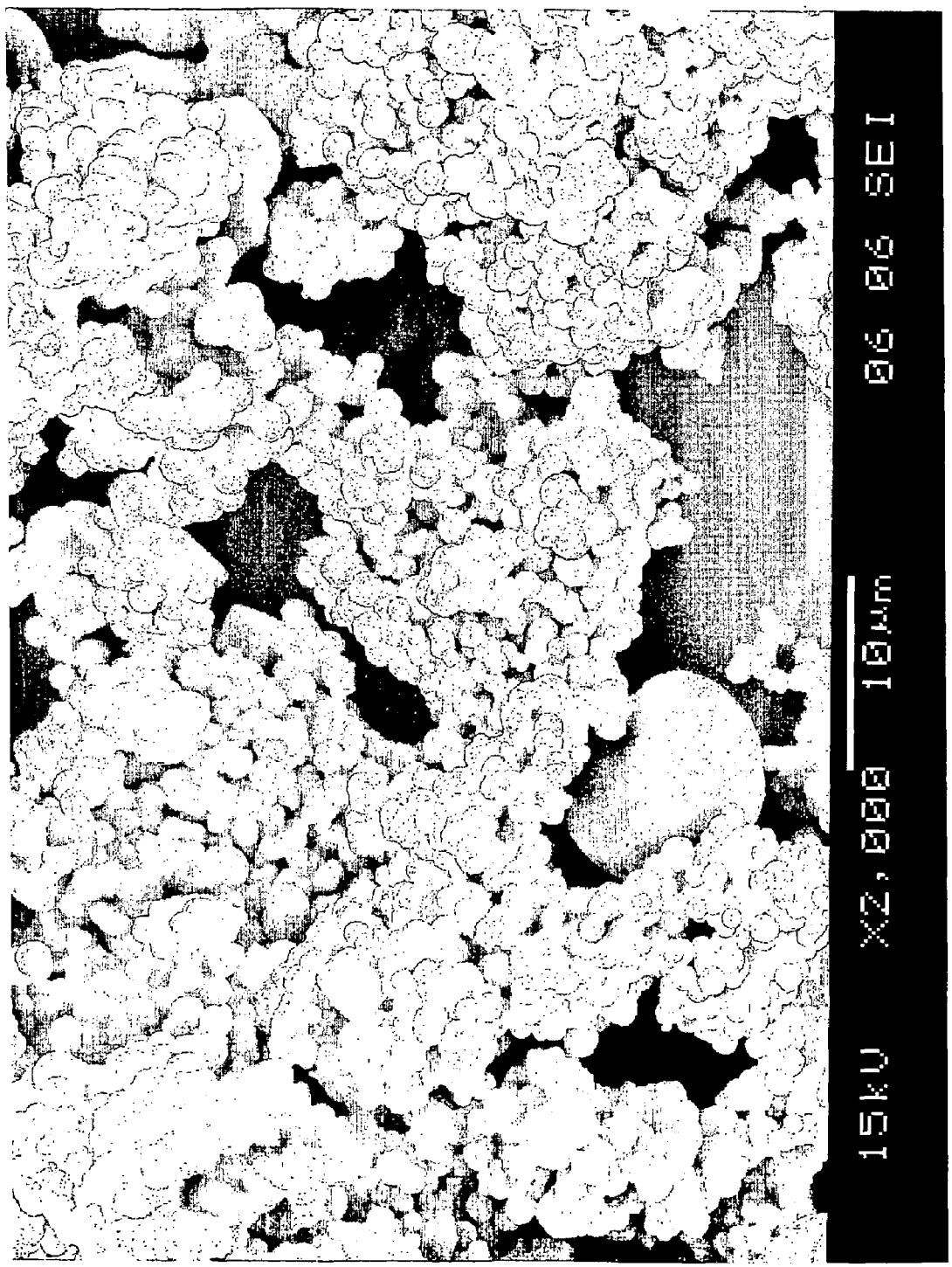

The operations of Example 3 were repeated, with this difference that a membrane having a MWCO of 30 kDa was used. The obtained reaction product $MnCO_3$ was analysed by means of a Scanning Electron Microscope (SEM), and the data from the analysis showed that disperse spherical $MnCO_3$ particles having a diameter of 500-1000 nm had been obtained (see FIG. 4).

EXAMPLE 5

Figure 5:
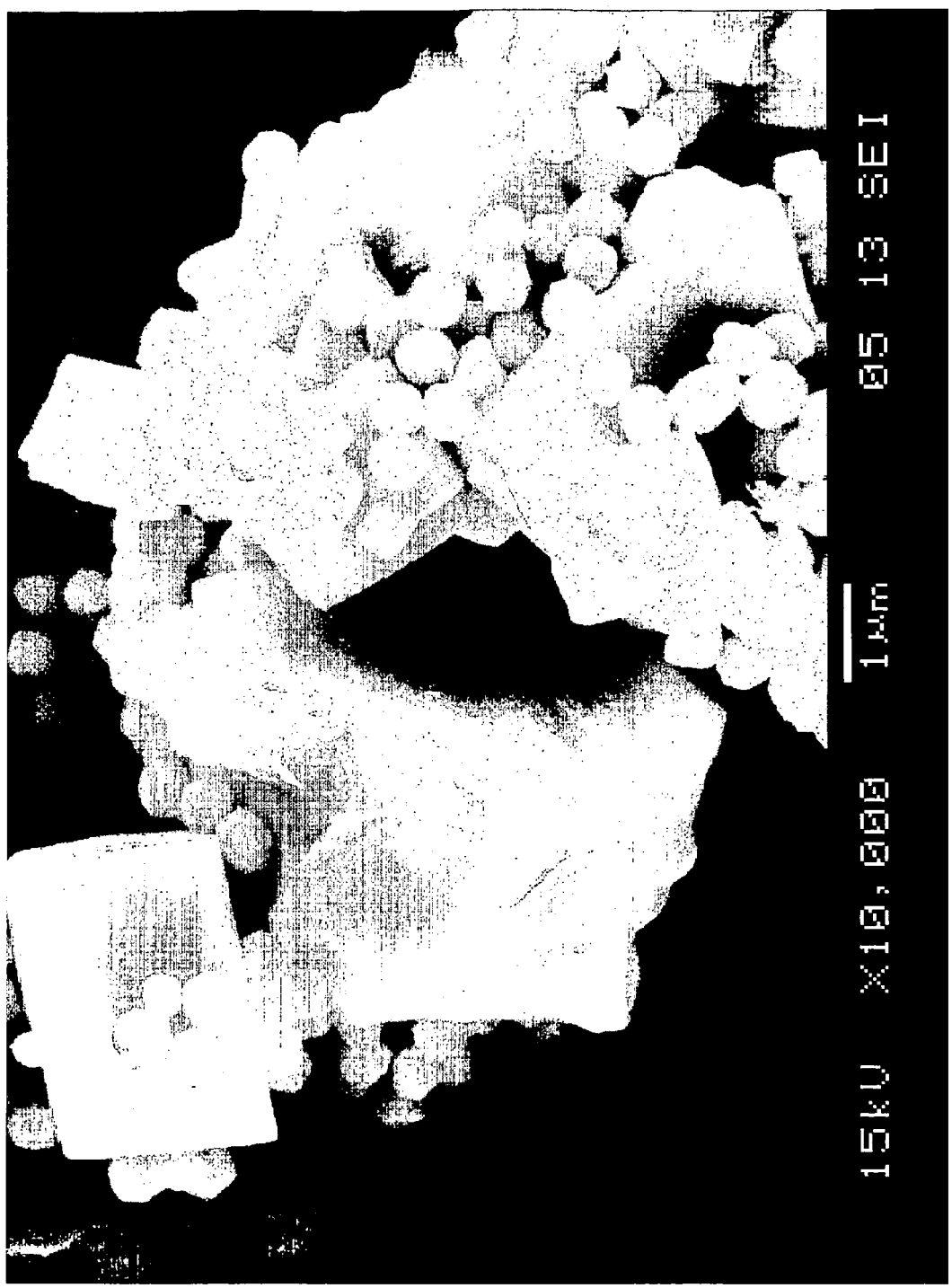

The same operations as in Example 1 were carried out, with this difference that a membrane having a MWCO of 3 kDa and a rotational force of 4500 g were used. The obtained reaction product $MnCO_3$ was analysed by means of a Scanning Electron Microscope (SEM), and the data from the analysis showed that monodisperse cubic $MnCO_3$ particles having a diameter of 200 nm had been obtained (see FIG. 5).

EXAMPLE 6

The same operations of Example 5 were repeated, with this difference a rotational force of 30.000 g was used for 60 minutes. The obtained product $MnCO_3$ was analysed by means of a Scanning Electron Microscope (SEM), and the data from the analysis showed that monodisperse cubic $MnCO_3$ particles having a diameter of 20 nm had been obtained.

EXAMPLE 7

The same reaction vessel as in Example 1 was first filled with 2 ml of 0.05 M KBr (aq) and then, after placement of a membrane having a MWCO of 3 kDa, with 0.5 ml of 0.03 M $AgNO_3$ (aq). After rotation for 30 minutes, using a rotational force of 4500 g, the desired product AgBr (s) and $KNO_3$ (aq) was obtained, after which AgBr was analysed by means of a Scanning Electron Microscope (SEM). The data from the analysis showed that monodisperse spherical AgBr particles having a diameter of 300 nm had been obtained.

EXAMPLE 8

The same operations of Example 7 were repeated, with this difference that KBr and $AgNO_3$ were used in amounts of 1 ml and 0.25 respectively. In addition, a rotational force of 30.000 g was used for 60 minutes. The obtained product AgBr was analysed by means of a Transmission Electron Microscope (TEM), and the data from the analysis showed that monodisperse spherical AgBr particles having a diameter of 30 nm had been obtained (see FIG. 6).

EXAMPLE 9

A reaction vessel having a volume of 120 ml was first filled with 40 ml of 0.75 M $NH_4CO_3$ (aq), which lower phase was separated, by means of an atomizer, from an upper phase consisting of 20 ml of 0.5 M $MnSO_4$ (aq). The reaction vessel was placed in a centrifuge and rotated for 30 minutes, using a rotational force of 2000 g and a temperature of 30° C. Upon completion of the rotation step, the desired product $MnCO_3$ (s) and $NH_4SO_4$ (aq) was obtained, and the $MnCO_3$ was analysed by means of a Scanning Electron Microscope (SEM). The data from the analysis showed that disperse cubic $MnCO_3$ particles having a diameter of 1500-2500 nm had been obtained.

The invention claimed is:

1. A method of preparing particles of a defined size, the method comprising:

providing a reaction vessel having a first reactant space and a second reactant space, the spaces being separated by a contactor;

introducing a first liquid reactant in the first reactant space;

introducing a second liquid reactant in the second reactant space;

rotating the reaction vessel so that the first reactant space is radially inside and the second reactant space is radially outside;

forming first reactant droplets when the first reactant passes the contactor under influence of a centrifugal force caused by the rotating of the reaction vessel;

transporting the droplets of the first reactant to the second reactant in the second reactant space under influence of the centrifugal force;

forming a reaction product in the form of particles when the first reactant has been brought into contact with the second reactant, the reaction product having a density that is greater than that of the second reactant; and transporting the reaction product particles to a radially outward end of the second reactant space due to centrifugal forces.

2. A method according to claim 1, characterized in that a contactor selected from the group consisting of membrane, diaphragm, filter and atomizer is used.

3. A method according to claim 2, characterized in that a membrane having a defined pore size is used.

4. A method according to claim 1, characterized in that a rotational force having an acceleration of at least 1000 g is used.

5. A method according to claim 1, characterized in that said rotational forces are generated by carrying out the reaction in a centrifuge.

6. A method according to claim 1 characterized in that a membrane of maximally 500 kDa is used.

7. A method according to claim 6, characterized in that a membrane of maximally 50 kDa is used.

8. A method according to claim 7, characterized in that a membrane of maximally 3 kDa is used.

9. A method according to claim 1, characterized in that the size of the reaction products formed by the reaction ranges from 10-3000 nm.

10. A method according to claim 1, characterized in that the size of the reaction products formed by the reaction is<300 nm.

11. A method according to claim 1, characterized in that the size of the reaction products formed by the reaction is<50 nm.

12. A method according to claim 1, characterized in that the reaction products formed by the reaction have a uniform particle size distribution.

13. A method according to claim 1, characterized in that the reactants are in the liquid phase.

14. A method according to claim 1, characterized in that the proportion between the density of the reaction product being formed and the density of the medium in which the reaction product is being formed by means of the reaction is at least 1.5:1.

15. A method according to claim 1, characterized in that the proportion between the density of the reaction product being formed and the density of the medium in which the reaction product is being formed by means of the reaction is at least 2:1.

16. A method according to claim 1, characterized in that inorganic particles are formed by the reaction.

17. A method according to claim 16, characterized in that said inorganic particles belong to the group consisting of oxides, carbonates, sulphides, halogenides and cyanides of one or more metals, or combinations thereof.

18. A method according to claim 1, characterized in that the reaction comprises a precipitation reaction.

19. A device comprising a reaction vessel including a contactor that separates a first reactant space for holding a first liquid reactant and a second reactant space for holding a second liquid reactant, the reaction vessel being rotatably mounted so that, when the reaction vessel rotates the first reaction space is radially inside and the second reactant space is radially outside, the contactor being configured for forming first reactant droplets when the first reactant passes the contactor under influence of a centrifugal force caused by the rotating of the reaction vessel.

* * * * *